Aug. 13, 1935.  H. V. JAMES  2,010,861
VULCANIZING DEVICE
Filed May 12, 1934
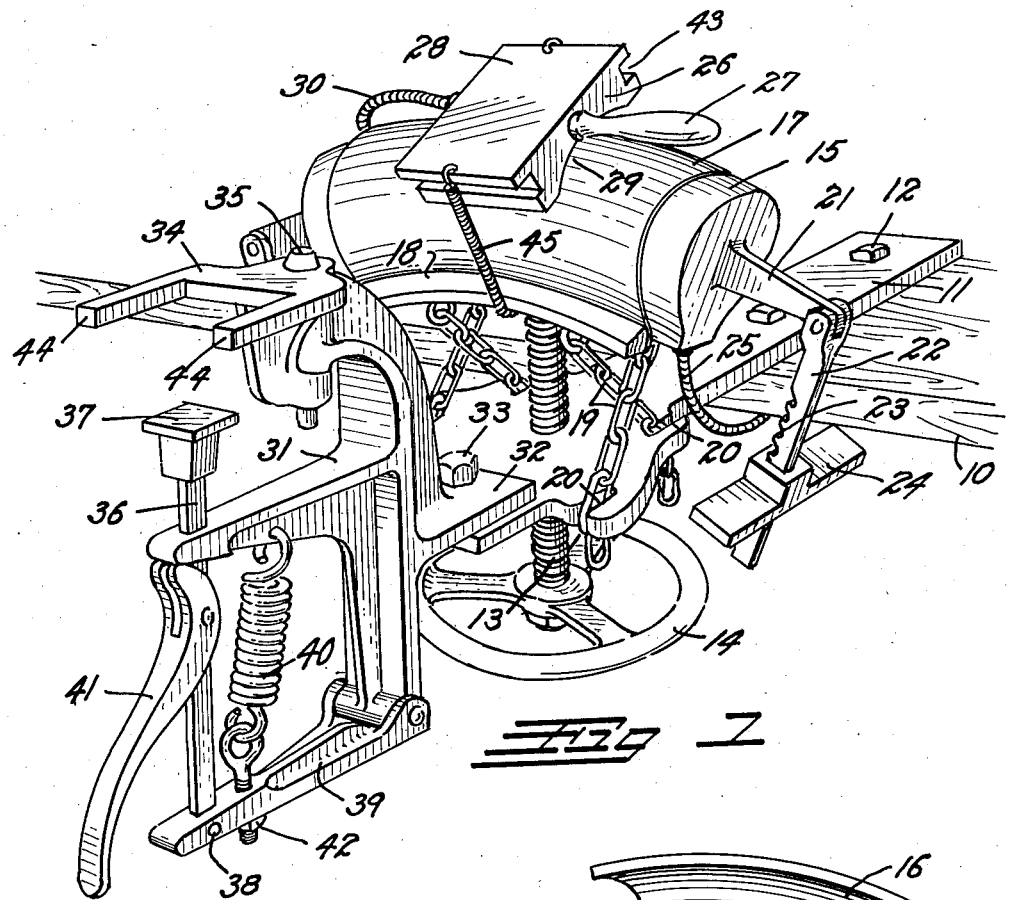
Fig. 1
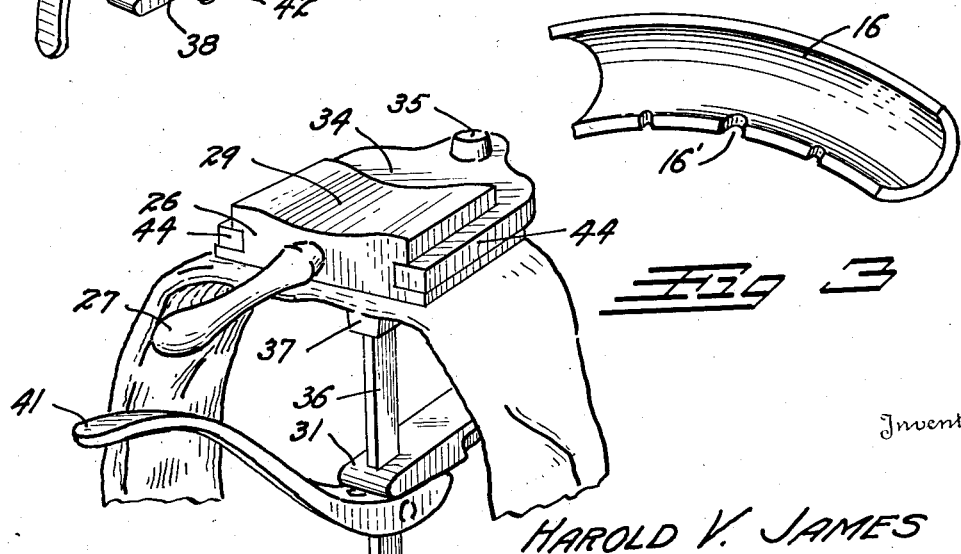
Fig. 2
Fig. 3
Inventor
HAROLD V. JAMES
By  Attorney Patented Aug. 13, 1935

2,010,861

UNITED STATES PATENT OFFICE 2,010,861

VULCANIZING DEVICE

Harold V. James, Kanarado, Kans.

Application May 12, 1934, Serial No. 725,304

9 Claims. (Cl. 18—18)

This invention relates to a tire repair device and has for its principal object the provision of a simple unitary construction which can be employed for both internal and external curing of casing repairs as well as for inner tube patching.

Another object of the invention is to so construct the device that the portion of the casing being repaired will be snugly molded against the vulcanizing surface whereas the remaining or surrounding portions of the casing will be held out of contact with the heated surface.

Other objects are to incorporate in a structure of this nature means for quickly removing or replacing casings thereon; means for employing the same heating element for both casing and inner tube repairing; and means for accommodating castings of various sizes.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view of the complete device set up for a casing repair.

Fig. 2 is a detail fragmentary detail view illustrating the method of repairing an inner tube thereon.

Fig. 3 is a detail view illustrating a typical shield of the type employed for increasing diameter of the casing mold.

The invention is arranged to be attached to any suitable supporting surface such as a work bench 10. The device consists of a base plate 11 which may be attached to the bench 10 by means of suitable attachment bolts 12. A vertical pressure or jack screw 13 is threaded through the plate 12 terminating at its lower extremity in a hand wheel 14. An electrically heated casing mold 15 is pivotally supported on the upper extremity of the screw 13. The mold 15 is shaped to conform to the inner surface of a typical tire casing. Its size can be increased for larger casings by placing thereon half shells 16 such as illustrated in Fig. 3. One of the half shells 16 is placed on each side of the mold 15 so as to increase its entire diameter. The shells 16 are notched as shown at 16' to pass around the jack screw 13.

The casing is clamped about the mold 15 by means of a relatively thin flexible, metal clamping band 17. The band 17 terminates at its edges in bead forms 18 from which depend tension chains 19. The base plate 11 is provided with suitable notches 20 for receiving the links of the chains 19. Bracket members 21 extend oppositely outward from the extremities of the mold 15, terminating in depending links 22. Each of the links 22 is notched, as shown at 23, to adjustably support a cross arm 24.

In using the casing portion of the device, the casing to be repaired is placed over the mold 15, preferably with the jack screw 13 in a lowered position. The cross bars 24 are then forced upwardly against the beads of the casing and engaged in the notches 23. The clamping band 17 is then placed over the casing with its chains crossed and positioned in the notches 20. The jack screw 13 is then tightened so as to elevate the mold 15 and force it into and against the shield 17 with the desired pressure. As the mold moves upwardly, the cross arms will lift the casing beads and elevate the casing at the extremities of the mold 15 so that it will not hang over the hot mold, and become burned at the extremities thereof.

The cross arms in lifting the casing at each extremity of the mold also prevent the weight of the casing from distorting it during the curing operation so that it will not be out of round. They also serve to compress the surface or tread portion of the tire at the point of repair so that the injury will be closed and oversize prevented. For this reason casings repaired upon this machine do not bump or pound upon the road.

It is desired to call attention to the fact that the crossed chains 19 not only pull the band 17 downwardly against the casing, but will also pull it inwardly at the bead so as to bring it into snug contact throughout its entire interior. Thus efficient curing of repairs adjacent the bead can be accomplished.

Current is supplied to the mold through a suitable conductor 25 so that the desired heat may be placed on the interior of the casing. For certain repairs this heat is sufficient, for other repairs it is necessary to supply heat to the exterior of the casing. This is accomplished by means of heating plate 26 provided with a suitable handle 27. One face of the heating plate 26 is a flat as shown at 28, the other face is arcuate as shown at 29. The arcuate face is placed upon the band 17, over the repair and is securely held in position thereon by means of a coiled tension spring 45 which is secured at its extremities to the plate 26 and passed beneath the mold 13. Electric current is supplied to a heating element of the plate 26 through a suitable conductor 30.

The heatings of both the mold 15 and the plate 26 are provided with thermostatic switches 46 by means of which they may be pre-set to produce any desired temperature so that a perfect cure may be had.

The tube repair portion of the device comprises a frame 31 provided with a shelf 32 arranged for attachment to the base plate 11 by means of a suitable clamp bolt 33. A bracket member 34 is hinged to the upper extremity of the frame 31 upon a suitable hinge pin 35. A vertically positioned push rod 36 is mounted in the frame 31 terminating at its upper extremity in a pressure head 37. The lower extremity of the rod 36 is hinged at 38 adjacent the forward extremity of a hinge member 39.

The hinge member 39 is hinged upon the lower extremity of the frame 31. A tension spring 40 constantly tends to urge the hinge member 39 and the pressure head 37 upwardly. This upward action is counteracted when desired by a cam lever 41 mounted upon the push rod 36. As the lever 41 is swung upwardly it will allow the pressure head 37 to move upwardly as shown in Fig. 2, and when swung downwardly, will pry the push rod 36 downwardly and lock it in the lowered position of Fig. 1. The tension in the spring 40 may be adjusted as desired by means of an adjusting nut 42.

The heating plate 26 is formed with grooves 43 in its sides. The bracket member 34 is U-shaped with forwardly extending extremities 44. This construction allows the plate 26 to be removed from the casing repair portion of the device and slid into the bracket member 34 with the prongs 44 engaging the grooves 43. In the latter position the plate is turned with its flat side 28 downwardly, as shown in Fig. 2.

The tube to be repaired is placed over the pressure head 37, or over a block resting upon the head 37. The lever 41 is then released and allowed to move upwardly. This allows the spring 40 to force the pressure head against the tube and the tube against the hot face of the plate 26. The tube can be quickly removed when cured by simply depressing the leved 41.

The pivoted attachment of the frame 31 on the bolt 33 allows it to be swung to any convenient angle for use. The pivoted attachment of the bracket member 34 on the pin 35 allows the hot plate 26 to be swung to any desired position over the pressure head to properly position it over the pressure head 37.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A vulcanizing device comprising: a curved mold adapted to fit the interior of a tire casing; means for drawing said casing snugly against said mold; and means for contacting the bead of said casing at the extremities of said mold to support said casing over said mold.

2. A vulcanizing device comprising: a curved mold adapted to fit the interior of a tire casing; means for drawing said casing snugly against said mold; a heating plate; a curved face on said heating plate; resilient means for clamping said curved face against said drawing means; said heating plate being provided with grooves in its edges; and a bracket member supported adjacent said mold so as to support said heating plate by means of said grooves.

3. A casing vulcanizer comprising: a base plate; a jack screw vertically threaded through said base plate; a segmental, casing-shaped, electrically heated, mold pivotally supported on said jack screw; a flexible, metallic band shaped to fit over said mold; and chains depending from said band, there being notches in said base plate for receiving the links of said chains for locking said band down upon said mold.

4. In a tire casing vulcanizer having a segmental, casing shaped, electrically heated mold adapted to receive a casing in a depended position; supporting members extending oppositely outward from the extremity of said mold; and cross arms supported by said supporting member so as to contact with the bead of a casing and support it over said mold.

5. In a tire casing vulcanizer having a segmental, casing shaped, electrically heated mold adapted to receive a casing in a depended position; supporting members extending oppositely outward from the extremity of said mold; links depending from said supporting members; cross arms adjustably supported on said links so as to contact with the bead portion of a casing suspended over said mold.

6. A casing vulcanizer comprising: a base plate; a jack screw vertically threaded through said base plate; a segmental, casing-shaped, electrically heated, mold pivotally supported on said jack screw; a flexible, metallic band shaped to fit over said mold; chains depending from said band, there being notches in said base plate for receiving the links of said chains for locking said band down upon said mold; a heating plate having a concave face; and flexible means for clamping the concave face of said heating plate against said band.

7. A casing vulcanizer comprising: a base plate; a jack screw vertically threaded through said base plate; a segmental, casing-shaped, electrically heated, mold pivotally supported on said jack screw; a flexible, metallic band shaped to fit over said mold; chains depending from said band, there being notches in said base plate for receiving the links of said chains for locking said band down upon said mold; a heating plate having a concave face; and flexible means for clamping the concave face of said heating plate against said band; a frame secured to said base plate; a vertically movable pressure member mounted in said frame; a bracket carried by said frame above said pressure member, said heating plate being provided with grooves for receiving said bracket.

8. In a vulcanizing device: a frame; a vertically movable push rod mounted in said frame; a spring urging said push rod upwardly; a manually operated cam for pushing said push rod downwardly; a pressure head mounted on the upper extremity of said push rod; a bracket supported by said frame above said push rod; and a heating plate slidably engaging said bracket.

9. In a vulcanizing device: a frame; a vertically movable push rod mounted in said frame; a spring urging said push rod upwardly; a manually operated cam for pushing said push rod downwardly; a pressure head mounted on the upper extremity of said push rod; a bracket supported by said frame above said push rod; and a heating plate slidably engaging said bracket, said frame and said bracket being mounted on independent pivots.

HAROLD V. JAMES.